United States Patent [19]

Lindner et al.

[11] 4,442,016

[45] Apr. 10, 1984

[54] INCREASING THE CYCLE STABILITY OF A SODIUM SULFATE HEAT EXCHANGE MEDIUM BY ADDING SULFURIC ACID

[75] Inventors: Friedrich Lindner, Stuttgart; Kurt Scheunemann, Lahr-Mietersheim, both of Fed. Rep. of Germany

[73] Assignee: Deutsche Forschungs-und Versuchsanstalt für Luft- und Raumfahrt E.V., Bonn, Fed. Rep. of Germany

[21] Appl. No.: 469,686

[22] Filed: Feb. 25, 1983

Related U.S. Application Data

[63] Continuation-in-part of Ser. No. 275,215, Jun. 19, 1981, abandoned.

[30] Foreign Application Priority Data

Jun. 27, 1980 [DE] Fed. Rep. of Germany ....... 3024125

[51] Int. Cl.³ ................................................. C09K 5/00
[52] U.S. Cl. .................................. 252/70; 165/104.21; 165/DIG. 4
[58] Field of Search ............... 252/68, 70; 165/104.21, 165/DIG. 4

[56] References Cited

U.S. PATENT DOCUMENTS

| | | | |
|---|---|---|---|
| 2,677,664 | 5/1954 | Telkes | 252/70 |
| 2,936,741 | 5/1960 | Telkes | 122/32 |
| 4,104,185 | 8/1978 | Schroder | 252/70 |
| 4,152,899 | 5/1979 | Herrick | 252/70 X |
| 4,287,076 | 9/1981 | Babin et al. | 252/70 |
| 4,303,541 | 12/1981 | Wasel-Nielen et al. | 252/70 |
| 4,349,446 | 9/1982 | Marks | 252/70 |
| 4,406,806 | 9/1983 | Despault et al. | 165/DIG. 4 |

FOREIGN PATENT DOCUMENTS 694553 7/1951 United Kingdom .

OTHER PUBLICATIONS

G. Kortüm "Lehrbuch der Elektrochemie" (Weinheim 1952), pp. 314–316.
McGraw-Hill Encyclopedia of Science and Technology, vol. 2, (1960), p. 362.
"An Incongruent Heat-of-Fusion System . . . " *Solar Energy*, vol. 23 (1979), pp. 343–350.

*Primary Examiner*—John E. Kittle
*Assistant Examiner*—Mukund J. Shah
*Attorney, Agent, or Firm*—Laubscher, Philpitt & Laubscher

[57] ABSTRACT

A method is disclosed for increasing the cycle stability of a latent heat accumulator medium consisting essentially of a pure or saturated sodium sulfate salt melt. The cycle stability is increased by adding sulfuric acid to the latent heat accumulator medium in an amount of from 0.5 to 3%, by weight, based on the weight of the latent heat accumulator medium. The pH value of the latent heat accumulator medium is lowered without precipitation of impurities or the occurance of supercooling in the latent heat accumulator medium.

3 Claims, No Drawings

INCREASING THE CYCLE STABILITY OF A SODIUM SULFATE HEAT EXCHANGE MEDIUM BY ADDING SULFURIC ACID

This application is a continuation-in-part of copending U.S. application Ser. No. 275,215 filed June 19, 1981 and now abandoned.

BACKGROUND OF THE INVENTION

The present invention relates to a method for increasing the cycle stability of a latent heat accumulator medium consisting essentially of a Glauber's salt melt. When using dynamic latent heat accumulators employing Glauber's salt as the latent heat accumulator medium, a fluid heat exchange medium is passed directly through the Glauber's salt melt to exchange heat. After passing through the accumulator medium, the heat exchange medium separates from the Glauber's salt melt. Low-viscosity oils are normally used as heat exchange medium.

Latent heat accumulators are generally known in which a Glauber's salt melt is used as the accumulator medium. The salt melt can be produced, for example, from technical sodium sulfate ($Na_2SO_4$) and water wherein 44.1% by weight $Na_2SO_4$, corresponding to 100% $Na_2SO_4.10\ H_2O$, is used. It is also possible to employ the composition of the solution which is saturated at 32° C. wherein 33.2% by weight $Na_2SO_4$, corresponding to 75.4% $Na_2SO_4.10\ H_2O$, is used.

However, Glauber's salt itself is not normally used for preparation of the accumulator medium since its practical application as a commercial product is limited owing to its water of crystallization content of approximately 56% by weight, the high transport costs thereby incurred, its low melting point of approximately 32° C., and its tendency to effloresce when stored for a long time. Furthermore, owing to the incongruent behaviour of Glauber's salt, it forms a two-phase system during melting, at a temperature of 32.4° C. for the very pure compound, consisting of a saturated solution with the aforementioned composition and solid sodium sulfate.

The initial salts employed in such latent heat accumulators are, as a rule for reasons of cost, technical products of varying purity. Moreover, during the life-span of the Glauber's salt accumulator medium, further contaminations are introduced into the melt, for example by the constant contact of the Glauber's salt melt with the container and the conduit pipes, as well as by the heat exchange circuit communicating with the accumulator container. In particular, corrosion products of metals coming into contact with the accumulator medium form in the salt. These contaminations usually lead, by chemical reactions with the accumulator medium and by other influences, to a loss of capacity and a reduction in the operating temperature of the accumulator, whereby the cycle stability of the accumulator medium is greatly reduced.

Experimental tests have shown that the pH value of the Galuber's salt melt produced from technical sodium sulfate is in the range of from 4.5 to 6.5. The melt is plainly cloudy and contains hydroxides in differing amounts, mainly brown iron hydroxide. If the pH value of the Glauber's salt melt is displaced into the alkali range for example by adding alkali hydroxides or similar substances, a protolysis reaction with water occurs and a quantitative precipitation of the heavy metals as metal hydroxides having a low solubility will result.

In order to prevent any supercooling from occurring in the Glauber's salt latent heat accumulator medium during the discharge of heat, it is well known in the art to add inoculating nuclei to the Glauber's salt melt, usually in the form of borax ($Na_2B_4O_7.10\ H_2O$), for enhancing the nucleation of the salt. However, the addition of borax also displaces the pH value into the alkali range, the pH value of the resultant Glauber's salt melt being between 8 and 9.5, depending on the concentration of borax which is added, thereby precipitating impurities. When the salts are employed in dynamic latent heat accumulators with direct heat exchange, the precipitated metal hydroxides are deposited on the interface of the melt and the heat exchange oil and pass into the heat exchange oil in varying amounts, thereby causing considerable problems in the circulation system for the heat exchange oil.

Due to the aforementioned adverse influences, which have an increasingly stronger effect during the life-span of the Glauber's salt melt, the Glauber's salt accumulator medium could not be operated trouble-free over a prolonged period if time.

SUMMARY OF THE INVENTION

It is therefore an object of the present invention to provide a method which overcomes the aforementioned disadvantages of the prior art and, more particularly, which increases the cycle stability of a latent heat accumulator medium consisting essentially of a Glauber's salt melt.

Another object of the present invention is to increase the cycle stability of latent heat accumulator media consisting essentially of Glauber's salt in order to protect these accumulator media from the undesired influence of contaminations and corrosion products.

It is a further object of the present invention to provide a method for increasing the cycle stability of a latent heat accumulator medium consisting essentially of a Glauber's salt melt wherein the pH value of the accumulator medium is lowered, preferably to approximately 3.5, without causing supercooling of the salt melt and without causing precipitation of heavy metal impurities which are included in the melt.

These and other objects and advantages are provided by the method of the present invention wherein an amount of between 0.5 and 3% by weight of sulfuric acid, based on the weight of the latent heat accumulator medium, is added to the latent heat accumulator medium.

Additional advantages of the present invention are disclosed in the following detailed description.

DETAILED DESCRIPTION OF THE INVENTION

In accordance with the method of the present invention, sulfuric acid is added to a latent heat accumulator medium in an amount of from 0.5 to 3% by weight, based on the weight of the latent heat accumulator medium.

Since the chemical processes occur solely in the saturated solution it is unimportant whether pure Glauber's salt is used as accumulator medium or the solution which is saturated at 32° C. is used. For this reason, no distinction will be made in the following between these two systems, the accumulator medium being referred to only as the Glauber's salt melt.

The addition of sulfuric acid displaces the pH to such a low value that heavy metal hydroxides can no longer precipitate and the Glauber's salt melt remains clear. However, the addition of sulfuric acid and the resultant displacement of the pH value also lead the borax, which is added as a nucleator, to be converted into boric acid. Therefore, the borax no longer serves as a nucleator. It has been surprisingly discovered, however, that even without the addition of the borax, a supercooling of the Glauber's salt melt will not occur if sulfuric acid alone is added. Experimental tests have shown that, depending on the cooling conditions employed during supercooling, values of between 0.5 and a maximum of 2 K occur. These are values which may be disregarded as negligible for practical operations. The addition of sulfuric acid therefore results not only in preventing the precipitation of metal hydroxides having low solubility but also prevents any undesired supercooling effects from occurring when the Glauber's salt melt is cooled, whereby the addition of special nucleators such as borax can be dispensed with entirely.

It has been experimentally determined that the most advantageous accumulator medium consisting essentially of Glauber's salt is provided by adding sulfuric acid in an amount sufficient to adjust the pH of the accumulator medium to a value which is less than 3.5. The exact concentration of acid in the melt in the pH range of below 3 or 4 can only be ascertained very inaccurately by a conventional pH measurement apparatus. Therefore, it is suggested that the latent heat accumulator medium consisting essentially of Glauber's salt is first adjusted by adding sulfuric acid to obtain a pH value of 4.5, after which a further 1% by weight of sulfuric acid is added. A pH value of 4.5 can be ascertained relatively exactly during measurement of the pH value, but the subsequent addition of 1% by weight of sulfuric acid adjusts the melt to a lower pH value which is very difficult to determine exactly during masurement. In this way it is possible to avoid adding an excess of sulfuric acid which would cause a reduction in the accumulation capacity. The sulfuric acid is normally added in a concentrated form whereby concentrated sulfuric acid is to be understood as a sulfuric acid having a content of between 95 and 97% by weight $H_2SO_4$ and a density of approximately 1.84.

Two examples of the method according to the present invention are described in the following. An accumulator apparatus hving a total volume of 1000 $dm^3$ is filled with 900 $dm^3$ latent heat accumulator medium consisting of Glauber's salt. The heat exchange oil and the installations in the latent heat accumulator have a total volume of approximately 100 $dm^3$.

EXAMPLE 1

Concentrated Glauber's salt was used as the latent heat accumulator medium.

First, 580 kg of technical grade sodium sulfate were poured into and mixed with 730 kg of water. the mixture was heted to approximately 40° C. and the pH value of the melt ascertained. The pH value of the melt was then adjusted to approximately 4.5 by adding concentrated sulfuric acid (density 1.84). Finally, 13 kg (7 $dm^3$) of concentrated sulfuric acid (density 1.84) were added.

EXAMPLE 2

The solution which is saturated at 32° C. was used as the latent heat accumulator medium. First of all, 400 kg of technical sodium sulfate were poured into and mixed with 800 kg of water. The mixture was heated to approximately 40° C. and its pH value ascertained. The pH value was then adjusted to approximately 4.5 by adding concentrated sulfuric acid (density 1.84). Finally, 12 kg (6.5 $dm^3$) of concentrated sulfuric acid (density 1.84) were added.

In both examples a completely clear melt was obtained which showed no trace of precipitated hydroxides. Upon cooling down only very slight supercooling occurred in both media, i.e. between 0.5 and 2 K.

While in accordance with the provisions of the Patent Statutes, the preferred form of the invention has been illustrated and described, it will be apparent to those skilled in the art that changes and modifications may be made without deivating from the inventive concepts set forth above.

What is claimed is:

1. A method for increasing the cycle stability of a latent heat accumulator medium consisting essentially of a concentrated or saturated salt melt of sodium sulfate, which method comprises adding sulfuric acid to the latent heat accumulator medium in an amount of from 0.5 to 3% by weight, based on the weight of said latent heat accumulator medium, thereby to lower the pH value of the latent heat accumulator medium without precipitating any impurities included therein and without causing appreciable supercooling of said latent heat accumulator medium.

2. A method as defined in claim 1, wherein said sulfuric acid is added in an amount such that the pH value of said latent heat accumulator medium is adjusted to a value which is less than 3.5.

3. A method as defined in claim 2, wherein said sulfuric acid is first added to said latent heat accumulator medium in an amount such that the pH value of said latent heat accumulator medium is adjusted to 4.5, whereafter a further amount of approximately 1% by weight, based on the weight of said latent heat accumulator medium, of sulfuric acid is added to said latent heat accumulator medium.

* * * * *